Patented July 19, 1938

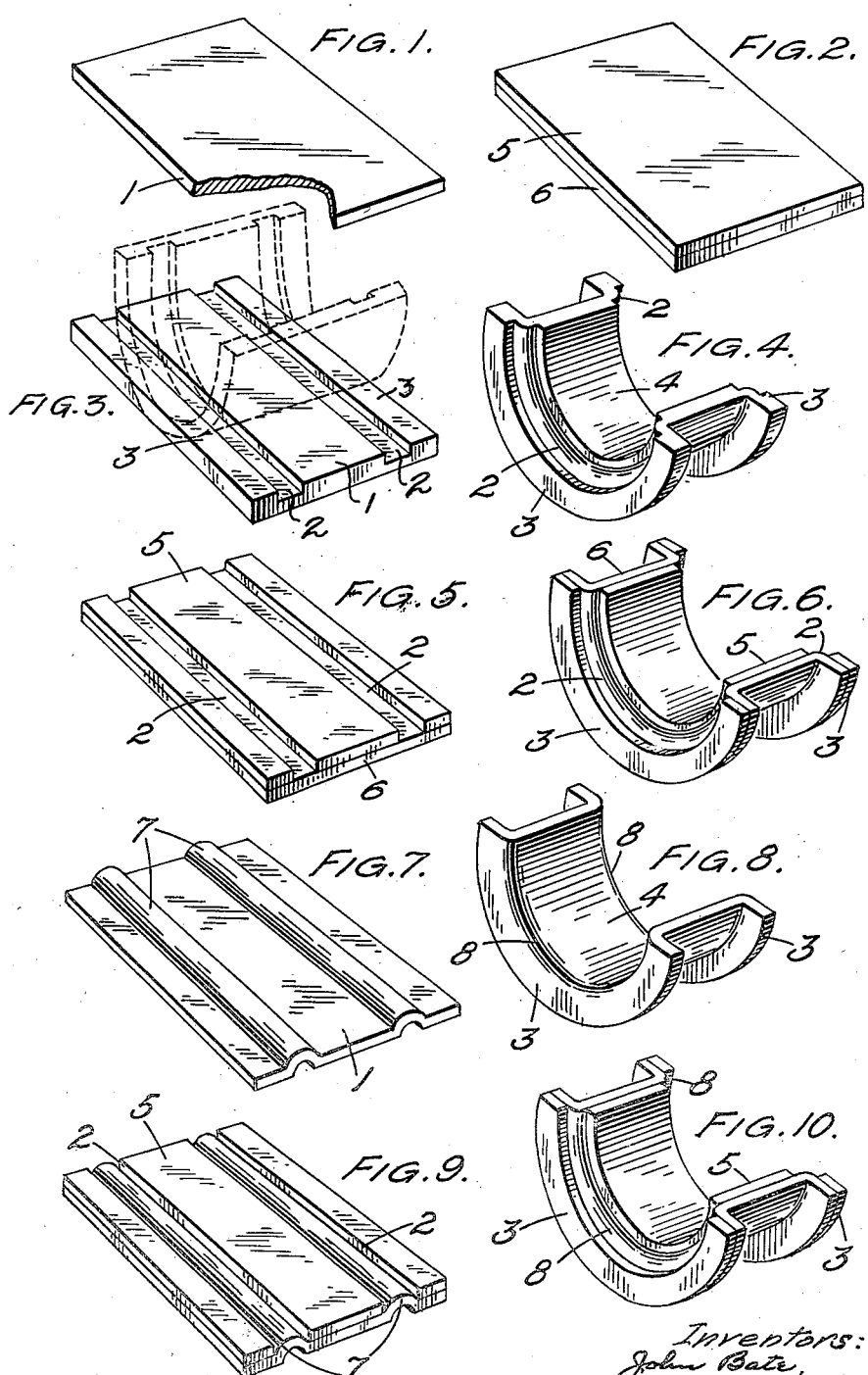

2,124,132

UNITED STATES PATENT OFFICE 2,124,132

MANUFACTURE OF BEARINGS

John Bate and Maurice Melhuish, Alperton, England, assignors to The Glacier Metal Company Limited, Alperton, England, a British company Application January 29, 1937, Serial No. 123,052
In Great Britain March 24, 1936

11 Claims. (Cl. 29—149.5)

This invention relates to flanged bearings such as are used in the main bearings and big ends of connecting rods for internal combustion engines, especially in cases where an end thrust occurs, that is to say a thrust at right angles to the axis of rotation of the crankshaft.

The invention is directed particularly towards a process of manufacture of flanged shells and liners from blanks or bi-metal blanks.

The term "liner" denotes hereafter a semicircular shell of backing metal, for example brass, bronze or steel, united to a lining of bearing metal, such as white metal, including cadmium and other alloys, or lead-bronze, including copper lead and other alloys. A pair of liners, held in the bearing housing or the big end housing, form a complete bearing. The term "blank" denotes a flat piece of backing metal prior to being given its semi-circular form, whilst the term "bi-metal blank" denotes a similar flat piece of composite metal, i. e. backing metal with a lining of bearing metal bonded thereto.

It has been found, when forming flanged shells and liners, that, if the flanges are applied to the blank or bi-metal blank before the latter are given its semi-circular form, it is extremely difficult to obtain satisfactory results, especially where the flanges are of any depth, since cracking will occur at the periphery of the flanges.

The prior application of John Bate, Serial No. 58,741 relates to a process of manufacturing flanged half bearing shells from blanks in which the step of bending the blank substantially into a U-shape is performed prior to the flanging of the article. That specification describes a process wherein a flat metal blank of substantially rectangular shape is first bent to form a U-shaped piece having a curvature at its apex approximating to the desired curvature of the finished bearing shell, but having the two end limbs of the U left substantially flat for a suitable distance from their ends, the said limbs being either tangentially disposed to the curved part, or preferably diverted slightly outwardly, the U-shaped piece being then subjected to the action of a flanging press whose die plates are adapted to turn the side margins of the U-shaped piece upwardly towards its apex at right angles, to form a flange or flanges of substantial depth, the said die plates being so shaped and positioned in relation to the punch that the upwardly pressed flange is squeezed between the inner sides of the die plates and the outer sides of the punch, whereby metal is caused to flow from the corners of the U-shaped piece towards the apex of the flanges. For convenience, this will hereinafter be referred to as "the said process".

In the course of experiment, it has been found that if the said process is applied to a blank of substantial thickness, for example exceeding ⅛", cracking tends to occur along the outside of the flange at the zone of juncture between the flange and the body of the shell, due to the suddenness of the curvature at that point. As a result, flanged half shells of substantial thickness have not been produced by the said process, but have been produced by turning in the common manner, with a consequent increase in expense.

It has further been found that if the said process is applied to a bi-metal blank, the same cracking will tend to occur, with the consequent risk of damage to the bond between backing and lining. For this reason, it has hitherto been found impossible in practice to produce flanged liners direct from bi-metal blanks by the said process, and the method of manufacture previously adopted has been first to form the flanged shells from backing metal by the said process, and subsequently to apply the necessary lining, after which the liner is machined to size as necessary.

The object of the present invention is to provide a means for obviating the above-mentioned cracking, whereby the said process may be applied, not only to metal blanks of greater thickness than has heretofore been possible, but also to bi-metal blanks, thereby enabling application of the lining to the backing to be performed while the blank is still in flat sheet or strip form, and obviating the more complicated operation hitherto entailed by applying a lining to a semicircular shell.

According to the invention, there is provided a process of manufacturing a flanged liner from a bi-metal blank, which consists in indenting the metal longitudinally of the bi-metal blank along the zones where the flanges will join the body of the liner when completed, in such a manner as to reduce the thickness of the material at said zones, bending the said bi-metal blank to a U-shaped piece and forming flanges on the side margins of the said U-shaped piece by means of a flanging press acting first on the horns of the U and eventually on the apex of the flanges.

The invention moreover includes the process of manufacturing a flanged shell from a blank, which consists in indenting the metal longitudinally of the blank along the zones where the flanges will join the body of the shell, when completed, bending the said blank to a U-shaped piece and forming flanges on the side margins of the said U-shaped piece, acting first on the horns of the U and eventually on the apex of the flanges.

The indenting may produce a depression on the working side of the bi-metal blank or blank (i. e. the side to which the lining has been, or will be, applied), or on the non-working side of the bi-metal blank or blank, or, in certain cases, on both sides.

The invention further includes a process of manufacturing a flanged liner or shell, wherein the formation of the depressions on the working side entails the removal of metal at the zone of juncture between the flanges and the body of the liner or shell. Where the process is applied to the manufacture of a flanged liner from a bi-metal blank, it may be found convenient to remove the bearing metal at the said zones to a depth as far as the upper surface of the backing metal.

The invention moreover embraces a process of manufacturing a liner or shell from a bi-metal blank or blank, wherein, prior to bending and flanging, a pair of longitudinal indentations are made in the form of channels of substantially semi-circular cross section at the point where the sharp curvature will occur when flanging takes place, the radius of said channels being approximately equal to the ultimate radius of the curvature when the flanging has taken place.

Any means may be used for indenting the bi-metal blanks or blanks, such as moulding, rolling, pressing, extruding, stamping, machining, e. g. milling and the like, either separately or in combination.

If desired, the indenting may be applied longitudinally of a continuous strip of backing metal or bi-metal, which latter, after indentation, is then cut into suitable lengths for blanks.

Various embodiments of the invention will now be described with reference to the accompanying drawing, whereof:—

Fig. 1 represents a blank of backing metal,

Fig. 2 represents a bi-metal blank of backing metal and bearing metal,

Fig. 3 shows a blank having longitudinal depressions formed on its working side, Fig. 4 shows a shell produced from the blank in Fig. 3, Fig. 5 shows a bi-metal blank having longitudinal depressions formed on its working side, Fig. 6 shows a liner produced from the bi-metal blank in Fig. 5, Fig. 7 shows a blank indented on its non-working side, Fig. 8 shows a shell produced from the blank in Fig. 7, Fig. 9 shows a bi-metal blank with the lining removed at the flanging zones, and having depressions on its non-working side, Fig. 10 shows a liner produced from the bi-metal blank in Fig. 9.

Throughout the specification and drawing, like parts will be referred to and illustrated by like reference numerals.

Referring to Figs. 1, 3 and 4 of the drawing, a flat blank 1 is provided with longitudinal grooves 2 formed in its working face by milling, the grooves 2 being at the zones where the flanges 3 will adjoin the main body 4 of the half-bearing shell, Fig. 4. The half-bearing shell is formed by bending the flat blank 1 to approximately semi-circular shape, as indicated in dotted line in Fig. 3, and then bending back the side edges of the semi-cylindrical blank. This shell must subsequently be given a lining of bearing metal.

Whilst this grooving process can be applied to a blank of any thickness or thinness, it is especially advantageous in cases where the blank is thicker than would normally be subjected to a bending and flanging process in which no grooving was employed.

Figs. 2, 5 and 6, of the drawing, show the same grooving process performed on a flat bi-metal blank having a working surface or lining 5 of bearing metal and a non-working surface of backing metal 6. In this case the grooves 2 are cut to a depth equal to that of the lining, i. e. extending down to, but not into, the backing metal 6. After the bending and flanging process has been applied, a liner is formed as shown in Fig. 6.

Fig. 7 shows a process of preparing a blank as in Fig. 1, by grooving it by means of rolling or the like on its non-working side, the indentation 7 being approximately equal in radius to the curved zones 8 (Fig. 8) at the juncture between the flanges 3 and the body of the shell 4.

Figs. 9 and 10 show a method of forming a liner from a bi-metal blank, by a combination of the processes referred to in relation to Figs. 5 and 6, and 7 and 8. Not only are grooves 2 cut in the bearing metal 5, but indentations 7 are also formed in the non-working side of the backing to assist in the ultimate formation of flanges 3 after the bi-metal blank has been bent to a U.

Having thus described our invention, what we claim and desire to protect by Letters Patent is:—

1. In the manufacture of a flanged bimetallic bearing shell of semi-cylindrical form, the steps which comprise indenting the metal of a blank along the zones at which the flanges are to join the body of the shell, bending the indented blank to approximately semi-cylindrical form, turning back the side edges of the approximately semi-cylindrical blank at the indented zones to form flanges at the edge of the shell, and simultaneously with the formation of each flange compressing the same to effect a flow of metal from the corners of the blank towards the apex of the flange.

2. In the manufacture of flanged half bearing shells, the invention as claimed in claim 1, wherein the indenting step produces depressions at the face of the blank which is concave in the finished bearing shell.

3. In the manufacture of flanged half bearing shells, the invention as claimed in claim 1, wherein the indenting step produces depressions at the face of the blank which is convex in the finished bearing shell.

4. In the manufacture of a flanged half bearing shell from a flat bimetallic blank, the steps which comprise indenting the metal of the blank longitudinally along zones where the flanges will join the body of the completed bearing shell, bending the indented blank to approximately semi-cylindrical form, bending the side edges of the semi-cylindrical blank at the indented zones to form flanges on the bearing shell, and simultaneously with the bending of the side edge compressing the metal thereof to effect a flow of metal towards the apex of each flange.

5. In the manufacture of flanged half bearing shells, the invention as claimed in claim 4, wherein the indenting step produces depressions at the face of the blank which is concave in the finished bearing shell.

6. In the manufacture of flanged half bearing shells, the invention as claimed in claim 4, wherein the indenting step produces depressions at the face of the blank which is convex in the finished bearing shell.

7. In the manufacture of a flanged bimetallic bearing shell of semi-cylindrical form, the steps which comprise removing metal from a blank along the zones at which the flanges are to join the body of the shell, bending the indented blank to approximately semi-cylindrical form, turning back the side edges of the approximately semi-cylindrical blank at the indented zones to form flanges at the edge of the shell, and simultaneously with the formation of each flange compressing the same to effect a flow of metal from the corners of the blank towards the apex of the flange.

8. In the manufacture of a flanged half bearing shell from a flat bimetallic blank, the steps which comprise removing metal from the blank longitudinally along zones where the flange will join the body of the completed bearing shell, bending the indented blank to approximately semi-cylindrical form, bending the side edges of the semi-cylindrical blank at the indented zones to form flanges on the bearing shell, and simultaneously with the bending of the side edge compressing the metal thereof to effect a flow of metal towards the apex of each flange.

9. In the manufacture of flanged half bearing shells from flat blanks comprising a plate of bearing metal having attached thereto a coating of bearing metal, the steps which include the complete removal of longitudinal strips of the bearing metal at the zones of junction of the body and flanges of the finished shell, shaping the blank to approximately semi-cylindrical form, and bending the side edges of the blank back to form flanges.

10. In the manufacture of a flanged bimetallic bearing shell, the steps which comprise forming substantially semi-cylindrical channels longitudinally of a flat bearing blank at zones where the flanges join the body of the finished shell, bending the blank to approximately semi-cylindrical form, and turning back the side edges of the semi-cylindrical shell blank to form the lateral flanges, the radius of curvature of said channels being approximately equal to the radius of curvature at said zones after the flanging operation.

11. In the manufacture of a flanged half bearing shell, the steps which comprise coating a rectangular blank of backing metal with a bearing metal, forming semi-cylindrical channels in the backing metal at zones where the flanges are to join the body of the finished shell, bending the indented blank to approximately semi-cylindrical form, and bending the side edges of the blank at said channel zones to form flanges in the shell, the radius of curvature of said channels being approximately equal to that of the junction zones of the flanges and the body of the finished flanged liner.

JOHN BATE.
MAURICE MELHUISH.